UNITED STATES PATENT OFFICE 2,315,400

RESINOUS COMPOSITION

Gaetano F. D'Alelio, Pittsfield, Mass., assignor to General Electric Company, a corporation of New York No Drawing. Application August 13, 1940, Serial No. 352,409

9 Claims. (Cl. 260—45)

The present invention relates broadly to certain improvements in methods of making resinous compositions. It is concerned more particularly with the production of compositions comprising a resinous reaction product of (1) an alkaline-catalyzed, liquid partial condensation product comprising mainly phenol alcohols obtained by reaction between an aliphatic aldehyde and a phenol containing at least two reactive positions in the aromatic nucleus with (2) a cyanamide derivative selected from the class consisting of dicyandiamide, melamine and mixtures thereof. The invention provides new materials especially suitable for use in the plastics and coating arts, for example in casting, molding, laminating, coating and adhesive applications, and for other purposes. Products of the invention include heat-hardenable and heat-hardened resins and molding compositions characterized by their light color and their resistance to discoloration.

It has been suggested heretofore that, in the production of phenol-formaldehyde resins free from odor, urea and other resin-forming additions of non-phenolic character should be added to the resin obtained by heating phenol and a molecular excess of formaldehyde in the presence of sodium carbonate or other basic catalyst until separation of water occurs, preferably by heating under reduced pressure until the water has been evaporated. The reaction mass prior to the addition of the urea no longer is in the phenol alcohol (methylol phenol) stage but is in the form of a precipitated or residual resin consisting essentially of methylene phenols. The addition of the urea binds the excess formaldehyde that is present in the resinous mass in the form of paraformaldehyde. It also has been suggested heretofore that resinous compositions may be prepared by effecting reaction between dicyandiamide and formaldehyde and between melamine and formaldehyde, and that such reactions may be carried out in the presence of other reactants e. g., urea. However, to the best of my knowledge and belief, it was not known or suggested prior to my invention that compositions having properties that make them particularly useful in industry, especially from the standpoint of color, color stability, simplicity of manufacture and cost, could be produced by causing melamine, dicyandiamide, or mixtures thereof, to react as hereafter disclosed and specifically claimed with an alkaline-catalyzed reaction product comprising preponderantly phenol alcohols produced by partial reaction between an aliphatic aldehyde, specifically formaldehyde, and a phenol containing at least two reactive positions in the ring.

As is well known when a phenol and an aliphatic aldehyde are caused to react under alkaline conditions, that is, at a pH above 7.0, a phenol alcohol forms first. As the reaction proceeds, a condensation product that at first causes the mass to become milky or opalescent is produced. If the reaction is allowed to proceed further, a separation of the mass into an aqueous layer and a thick, syrupy, oily, resinous layer takes place. In carrying the present invention into effect, melamine, dicyandiamide or a mixture of melamine and dicyandiamide is incorporated with the phenolic reaction product when the latter is in the form of a clear solution comprising mainly a mixture of phenol alcohols. In all cases the cyanamide derivative is incorporated into the phenolic reaction product before the production of the above-described oily layer. The mixed components then are reacted further. The mixture may be heated for a short time prior to dehydration or immediately may be dehydrated. In the latter case the phenol-aldehyde partial condensation product and the cyanamide derivative co-react simultaneously with the dehydration of the liquid reaction product.

Although the exact nature of the reactions that take place between the phenol alcohols and the melamine or dicyandiamide is not definitely known, it is believed that the reactions proceed as shown below. For purpose of illustration, the reaction of equimolecular proportions of dimethylol phenol and dicyandiamide is shown in the one case, and of trimethylol phenol and melamine in the other.

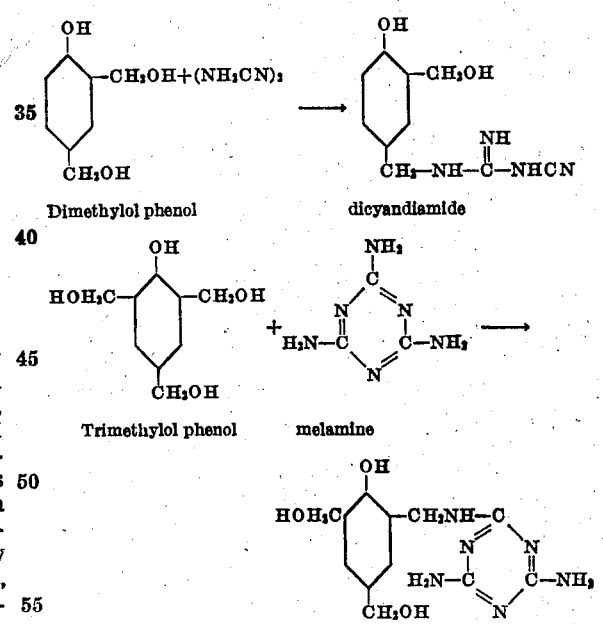

Resinification of the phenol alcohol-melamine (or phenol alcohol-dicyandiamide, or phenol alcohol-melamine-dicyandiamide) reaction products proceeds concurrently with the resinification of any unreacted phenols remaining in the reaction mass.

Heat curable resinous compositions are obtained by completing the condensation reaction between the phenol alcohols and the cyanamide derivative at a pH below 7.0. Such pH conditions advantageously are obtained by adding an acidic substance to the reaction mass before dehyrating the same or after the mass has been partly but not completely dehydrated. Generally the mass is acidified before precipitation of the resinous material comprising the phenol alcohol-cyanamide derivative reaction product. Acidification to a pH of 5.0 or lower, preferably to a pH within the range of 2.0 to 4.0, usually gives resinous products of optimum color, color stability and curing characteristics. Examples of acidic substances that may be used to obtain the acidic conditions are organic acids, e. g., oxalic, phthalic, citric, acetic, lactic, acrylic, malonic, maleic, etc., also, acidic alkyd resins, etc. Anhydrides of organic acids may be employed, if available. Although I prefer to use an organic acid, since products of optimum color lightness and stability thereby are obtained, inorganic acids, e. g., phosphoric, hydrochloric, etc., or acidic salts, e. g., sodium acid phosphate, sodium acid sulfate, etc., may be used when the matter of color or color stability is of secondary consideration.

In carrying the present invention into effect any phenol having at least two reactive positions in the aromatic nucleus may be employed. The choice of the phenol depends upon economic considerations and upon the particular properties desired in the end product. Thus, for the production of oil-soluble resins I may use a phenol selected from the class consisting of ortho-substituted and para-substituted phenols having two reactive positions in the aromatic nucleus and at least four carbon atoms in the substituent grouping, e. g., ortho- and para-substituted butyl phenols, amyl phenols, phenyl phenols, 1-phenethyl phenols, indene phenols, additional examples of which are given in my copending application Serial No. 319,515, filed February 17, 1940, and assigned to the same assignee as the present invention. For the production of casting resins and molding compositions I prefer to use a phenol having the graphic formula

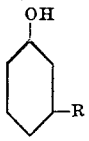

where R is a member of the group consisting of hydrogen, alkyl radicals (e. g., methyl, ethyl, propyl, butyl, etc.), aryl radicals (e. g., phenyl, cresyl, etc.) and alkoxy radicals (e. g., methoxy, ethoxy, etc.).

The choice of the aliphatic aldehyde component also is dependent upon economic consideration and upon the particular properties desired in the finished product. I prefer to use as the aldehydic component (and particularly for the production of heat-curable casting resins and molding compositions) formaldehyde or polymeric modifications thereof, e. g., paraformaldehyde, trioxymethylene, etc. For some applications of the finished resin I may use other aliphatic aldehydes, for instance acrolein, methacrolein, acetaldehyde, propionaldehyde, butyraldehyde, crotonaldehyde, etc., mixtures thereof, or mixtures of formaldehyde (or compounds engendering formaldehyde) with such aliphatic aldehydes. In general, the longer the chain of the aliphatic aldehyde, the slower the cure of the resinous condensation product and the softer the final product. The resins obtained with aliphatic aldehydes other than formaldehyde usually are not so light-colored nor so light-stable as the resins obtained with formaldehyde.

The ratio of the aliphatic aldehyde to the phenol reactant may be varied over a wide range, but preferably is within the range of 1 mol of the phenol to at least 1 mol of the aliphatic aldehyde (e. g., 1 to 4 or 5 mols aliphatic aldehyde). No particular advantages ordinarily accrue from using more than 3 mols of aliphatic aldehyde. For producing casting resins and molding compositions, optimum results are obtained by using 1 mol of the phenol component to approximately 1.5 to 3 mols formaldehyde. By varying the ratio of the phenol to aliphatic aldehyde, the rate of cure and the strength of the final product may be varied.

In producing the phenol alcohols the condensation reaction between the phenol and the aliphatic aldehyde is carried out under alkaline conditions at a temperature preferably not exceeding substantially 90° C., usually at temperatures within the range of 30° C. to 80° C., e. g., 40° to 70° C. The alkaline catalyst employed advantageously is one that has no darkening effect upon the resin. Hydroxides of the alkaline-earth metals (calcium, strontium and barium) and hydroxides, carbonates, cyanides, acetates and borates of the alkali metals (lithium, sodium, potassium, rubidium and caesium) are examples of catalysts, specifically so-called "fixed catalysts", that may be employed.

The cyanamide derivative may be incorporated into the reaction mass during the formation of the methylol phenols or after their formation and before resinification to a mass comprising mainly methylene phenols has taken place. The amount of cyanamide derivative may be considerably varied, but I prefer to use not exceeding substantially 20 per cent by weight of the starting phenol (from which the methylol derivative is produced) of melamine, dicyandiamide or a mixture of melamine and dicyandiamide. With such an amount of cyanamide derivative, heat-stable compounds that can be molded at temperatures of the order of 130° to 150° C. to yield light-colored, light-resistant (resistant to discoloration under the influence of light or heat and light) products most readily are produced. The molded articles also have good heat-stability, showing little or no discoloration when heated over a long period of time in the presence or absence of light. Larger amounts of the cyanamide derivative yield products of darker color or lesser plasticity. This may not be objectionable for some applications, but is undesirable when molding resins and compounds of optimum color and plasticity are desired. Color stabilization also is lessened if the cyanamide derivative is added after resinification of the methylol phenols to a mass comprising mainly methylene phenols, indicating that this property is dependent in some way, which is not clearly understood, upon the reaction that takes place between the cyanamide derivative and the methylol phenols (phenol alcohols).

It also was found that not all substances of the nature of urea will impart light-stability and heat-stability characteristics to a phenol-formaldehyde resin. For example, when urea or biguanidine (which compounds in many reactions are the known equivalents of melamine and dicyandiamide) is substituted for melamine or dicyandiamide in the reaction with the phenol alcohols, the molding compounds made from the resulting resins show objectionable discoloration (yellowing) during the molding operation. In marked contrast, the molding resins and compounds of this invention show no substantial discoloration during the molding operation.

The resin syrups obtained after the addition and intercondensation of the cynamide derivative vary from clear, water-white solutions to milky, opalescent dispersions when hot. They may be mixed with fillers, dyes, pigments, lubricants, plasticizers, etc., and then dried to produce molding compounds. Or, they may be used in their original undehydrated state, or after partially or completely dehydrating under heat, vacuum or heat and vacuum and then dissolving in a volatile solvent, e. g., ethyl alcohol, to produce varnishes of adjusted viscosity and concentration that may be used for coating and impregnating purposes, for instance in the production of enameled wire, laminated sheet stock, etc. The completely dehydrated resin also may be ground with, or may be ground alone and then mixed with, fillers, dyes, pigments, lubricants, plasticizers and other effect agents to produce molding compounds.

For casting resin applications, but not necessarily for other uses of the resin, it is important that the temperature of dehydrating the resin syrup does not exceed substantially 110° C. If higher temperatures are reached, the cured resin may form star cracks in the cast object. Such cracks are objectionable from the standpoint both of appearance and maximum strength of the casting. Hence the mass preferably is so dehydrated under reduced pressure that the maximum temperature attained is not higher than about 90° or 95° C.

During the process of curing the cast resins of this invention in molds the resin temperature should not exceed substantially 110° C. Best results are obtained by curing at a temperature which does not exceed substantially 100° C. and which preferably is of the order of 75° to 90° C. Lower curing temperatures, for example 60° to 70° C. may be used, but the curing process then proceeds much more slowly. When the resinous compositions of my invention are used in laminating and adhesive applications, the resin may be cured in situ at much higher temperatures, for instance at temperatures of the order of 130° to 140° C.

In order that those skilled in the art better may understand how the present invention may be carried into effect, the following illustrative examples are given. All parts are by weight.

Example 1

| | Parts |
|---|---|
| Redistilled synthetic phenol | 90.0 |
| Aqueous formaldehyde (approximately 37.1% HCHO) | 195.0 |
| Potassium carbonate in 20 parts water | 2.85 |
| Melamine | 4.5 |

All of the above components with the exception of the melamine were mixed and reacted for 4 hours at 50° C., yielding a liquid reaction mass comprising substantially a solution of methylol phenols in water. The solution was free from precipitate. To this reaction mass was added the above-stated amount of melamine and the mass was refluxed for 30 minutes. The pH of the reaction mass was 8.53. After the addition of 4.86 parts oxalic acid in 20 parts hot water the pH of the resin syrup was 2.72. This syrup was compounded with 114 parts alpha flock and 1.14 parts zinc stearate (mold lubricant). After drying the compound for 5 hours at 60° C., it was sheeted on differential rolls for 30 seconds, pulverized by ball milling and then molded at 135° to 140° C. for 5 minutes under a pressure of 2000 pounds per square inch. The molded pieces were white in color and were hard and well cured throughout.

When 4.5 parts urea were substituted for the melamine in the above formula, the molding compound made from the resulting resin under identical conditions had insufficient plasticity to fill out the mold used in making the molded article. Furthermore, the molded fragment had an objectionable canary yellow color, showing that the compound was not stable under heat against discoloration.

Example 2

Same formula and procedure as described under Example 1, with the exception that the wet compound was dried for 2½ hours at 70° C. and then sheeted for 1 minute on the differential rolls. After grinding to a particle size such that substantially all of it passed through an 8-mesh screen, the compound was mixed with 0.95 part titanium dioxide and 0.057 part of a light-stable, reddish dye, followed by pulverizing to a very fine powder in a ball mill. After preforming the resulting powder into molding pellets, the pellets were molded. The molded article was hard, well cured, had an excellent gloss and was tinted a beautiful pastel shade best described as salmon pink.

Example 3

Same formula and procedure as in Example 1 with the exception that 9.0 parts instead of 4.5 parts melamine were used in making the resin syrup. The molded articles were very similar to the products of Example 1, but the molding compound was much harder and had less plasticity. Suitable plasticizers may be incorporated into the mass when greater plasticity is required. Polyvinyl acetate is an excellent plasticizer when milled into the compound.

Example 4

Same formula and procedure as in Example 1, with the exception that 4.5 parts dicyandiamide were used in making the resin instead of 4.5 parts melamine. After acidification of the resinous syrup, the pH was 2.37. The molded article was well cured, free from any yellow cast or discoloration and had completely filled out the mold, showing that the molding compound had good plastic flow.

It was wholly unexpected and unpredictable to find that the molding compositions exemplified by the above examples had good curing qualities, since they were prepared from resinous condensation products of exceptionally low pH and it is generally understood in the phenol-aldehyde resin art that suitable industrial molding compositions can be produced only when highly alkaline resins (pH considerably above 7.0) are used.

That molding compositions of good storage stability and good flow characteristics could be obtained from these new low pH resins also was quite surprising and unpredictable, particularly in view of the fact that resins produced from the cyanamide derivatives, e. g., urea, melamine, dicyandiamide, etc. (and molding compositions prepared from such resins), are unstable at a pH below 6.0 and have relatively poor storage stability and flow characteristics at low pH values.

From the foregoing description it will be seen that the present invention provides resinous compositions consisting of the product of reaction of (1) phenol alcohols (or a mass comprising essentially phenol alcohols) produced by reaction between an aliphatic aldehyde, specifically formaldehyde, and a phenol containing at least two reactive positions in the aromatic nucleus, specifically phenol ($C_6H_5OH$), and (2) a cyanamide derivative selected from the class consisting of dicyandiamide, melamine and mixtures thereof. The invention also provides compositions comprising a resinous reaction product of a phenol alcohol and melamine, of a phenol alcohol and dicyandiamide, and of a phenol alcohol and a mixture of melamine and dicyandiamide. The phenol alcohol is derived from a phenol containing at least two reactive positions in the aromatic nucleus.

In general, these new compositions are prepared by forming a liquid mass comprising mainly methylol derivatives of a phenol containing at least two reactive positions in the aromatic nucleus, causing to react therewith the herein-described cyanamide derivative, and resinifying the resulting product. Usually I prepare these new resins by partially condensing the phenol and aliphatic aldehyde at a pH above 7.0 to form a liquid mass comprising essentially methylol derivatives of the phenol, effect initial reaction between the said liquid mass and the herein-described cyanamide derivative at a pH above 7.0, and complete the reaction between the said components at a pH below 7.0. A preferred method of preparation comprises partially condensing 1 mol phenol with an aqueous solution of approximately 1.5 to 3 mols formaldehyde at a pH above 7.0 to form a liquid mass comprising mainly phenol alcohols, incorporating into the said liquid mass not exceeding substantially 20 per cent, more particularly from 2 to 20 per cent and preferably from 2 to 10 per cent (by weight of the phenol), of a cyanamide derivative, namely, melamine, dicyandiamide or a mixture thereof, effecting partial reaction between the said liquid mass and cyanamide derivative, and dehydrating the resulting mass at a pH below 5.0 simultaneously with effecting further reaction between the reactive components of the mass.

In producing the phenol alcohols, I prefer to use phenol itself. If a substituted phenol be employed, it must be free of substituent groups in both ortho positions or in one ortho position and the para position with reference to the hydroxyl group of the phenol. Such substituted phenols therefore are capable of forming dialkylol derivatives. By careful preparation, liquid masses consisting substantially, or even solely, of phenol alcohols can be obtained.

To obtain light-colored products, materials of a high degree of purity should be used. The phenol should be a specially distilled material, preferably water white and substantially free from bodies capable of imparting color to the cured resin. The condensation catalyst should meet the specifications of the United States Pharmacopoeia for purity, or be of an equivalent grade. The purest available aliphatic aldehyde, melamine and dicyandiamide should be employed.

The fundamental resins of this invention may be varied widely by introducing other modifying bodies before, during or after effecting reaction between the primary components. Thus, as modifying agents I may use, for example, monohydric alcohols such as ethyl, propyl, isopropyl, butyl, amyl, etc., alcohols; polyhydric alcohols such as ethylene glycol, diethylene glycol, glycerine, pentaerythritol, trimethylol nitro methane, etc.; monoamides such as formamide, acetamide, stearamide, acrylamides, benzamide, toluene sulfonamide, etc.; polyamides such as adipic diamide, phthalamide, and the like; amines such as ethylene diamine, aniline, phenylene diamine, aminophenols, etc.

The modifying bodies also may take the form of high molecular weight bodies with or without resinous characteristics, for example hydrolyzed wood products, lignin, proteins, protein-aldehyde condensation products, furfural condensation products, urea-aldehyde condensation products, aniline-aldehyde condensation products, modified or unmodified, saturated or unsaturated polybasic acid-polyhydric alcohol condensation products, sulfonamide-aldehyde resins, water-soluble cellulose derivatives, natural gums and resins such as copal, shellac, rosin, etc., polyvinyl compounds such as polyvinyl alcohol, polyvinyl acetals, specifically polyvinyl formal, synthetic linear condensation products such as the superpolyamides, etc.

Other modifying agents of a plasticizing or softening nature also may be incorporated with the condensation products of this invention. Examples of such modifying agents are the phthalate esters, for instance dimethyl phthalate, diethyl phthalate, dibutyl phthalate, etc., the phosphate esters such as tricresyl phosphate, triphenyl phosphate, etc.

Dyes, pigments and opacifiers (e. g., barium sulfate, zinc sulfide, titanium compounds such as the oxides, flaked aluminum, copper, etc.) may be incorporated into the compositions to alter the visual appearance and the optical properties of the finished product. Mold lubricants such as the metallic soaps of the high molecular weight fatty acids, e. g., the stearates and palmitates of tin, zinc, cadmium, calcium, etc., waxes such as carnauba, high melting point paraffin waxes, etc., may be added to facilitate molding of the compositions. Various fillers may be used to provide a wide variety of molding compositions, e. g., bleached or unbleached wood flour, alpha cellulose in flock form, sheets or cuttings of paper, cloth, canvas, etc., asbestos in powdered, long or short fiber length, as well as defibrated asbestos, powdered or flaked mica, wood chips; short or long wood fibers, synthetic or natural continuous threaded fibers, glass fibers in continuous filament or fabric (woven or felted) form, etc.

In the preparation of molding compositions from the resinous bodies of this invention, the non-dehydrated or the partially dehydrated resins may be compounded with the above agents in accordance with procedures well known in the art. The wet composition may be dried in the usual manner either at normal (room) temperature or at elevated temperature in a preheated stream of air or under the influence of reflected heat energy. The dried compound may be densified through the usual processes of working in a Banbury mixer or by rolling, pelleting or other means, followed by grinding and screening to the desired particle size. These molding compositions may be molded at elevated temperatures, preferably between 100° and 150° C., and at suitable pressures. The molding pressures generally range between about 1,000 and 4,000 pounds per square inch, more particularly from about 2,000 to 3,000 pounds per square inch.

In addition to their use in molding compositions or in the form of casting resins, the condensation products of this invention also may be used as water repellents, fire retardants and sizings when applied to wood or the like, or to fibrous materials such as silk, cotton, wool, synthetic organic fibers, etc., in continuous filament, thread, fabric or other form. It will be understood, of course, that optimum resistance to water, fire, solvents, etc., is obtained only when the applied coating or sizing is converted to the insoluble, infusible (cured) state. The cellulosic fibrous materials to be treated may be surface coated or both coated and impregnated by any suitable means, for example by spraying with, or immersing in, a solution of the treating agent and thereafter removing the solvent.

The modified and unmodified products of this invention have a wide variety of other uses, for instance in making rods, sheets, tubes, clock cases, door knobs, telephone receiving sets, radio cabinets, vases, umbrella handles, household and office articles, decorative novelties, building construction materials, and various other cast, molded and laminated articles. They may be used in the production of wire or baking enamels, especially in combination with other synthetic materials; for bonding or cementing together mica flakes to form a laminated mica article; with or without solvents as impregnants for many porous bodies, such as cork, pottery, felts or fabricated bodies with interstices, netted fibers, interwoven fibrous materials, concrete, synthetic boards, etc. They also may be employed as impregnants for electrical coils, for example paper-insulated layerwound coils which, after curing, are the equivalent of a molded coil, as well as for impregnating or otherwise treating other electrical devices. They also may be used in making laminated fibrous sheet material wherein superimposed layers of cloth or paper are firmly bonded together with the resin; as binders for abrasive particles in forming sheet and molded abradants; and as modifiers of other natural and synthetic resinous materials and coating compositions.

What I claim as new and desire to secure by Letters Patent of the United States, is—

1. The process of preparing a resinous composition which comprises partially condensing, at a pH above 7.0, an aliphatic aldehyde with a phenol containing at least two reactive positions in the aromatic nucleus thereby to form a liquid mass comprising essentially alkylol derivatives of the said phenol, effecting initial reaction between the said liquid mass and a cyanamide derivative selected from the class consisting of dicyandiamide, melamine and mixtures thereof, said cyanamide derivative being employed in an amount corresponding to from 2 to 20 per cent by weight of the said phenol, and completing the reaction between the said components at a pH below 7.0.

2. The process of preparing a resinous composition which comprises partially condensing 1 mol phenol with an aqueous solution of approximately 1.5 to 3 mols formaldehyde at a pH above 7.0 to form a liquid mass comprising mainly phenol alcohols, incorporating into the said liquid mass from 2 to 20 per cent by weight of the phenol of a cyanamide derivative selected from the class consisting of dicyandiamide, melamine and mixtures thereof, effecting partial reaction between the said liquid mass and cyanamide derivative, and dehydrating the resulting mass at a pH below 5.0 simultaneously with effecting further reaction between the reactive components of the mass.

3. The process of preparing a resinous composition which comprises partially condensing, at a pH above 7.0, formaldehyde with a phenol containing at least two reactive positions in the aromatic nucleus thereby to form a liquid mass comprising essentially methylol derivatives of the said phenol, effecting initial reaction between the said liquid mass and melamine in an amount corresponding to from 2 to 20 per cent by weight of the phenol, and completing the reaction between the said components at a pH below 7.0.

4. The method of preparing a resinous composition which comprises forming a liquid mass comprising essentially a methylol phenol by partially condensing phenol with formaldehyde at a pH above 7.0, effecting initial reaction between the said liquid mass and a cyanamide derivative selected from the class consisting of dicyandiamide, melamine and mixtures thereof, said cyanamide derivative being employed in an amount corresponding to from 2 to 10 per cent by weight of the phenolic starting reactant, and completing the reaction between the said components at a pH below 7.0.

5. The method of preparing a light-colored, oil-soluble resinous composition which comprises forming a liquid mass having a pH above 7.0 and comprising mainly methylol derivatives of an ortho-substituted phenol having two reactive positions in the aromatic nucleus and containing at least four carbon atoms in the substituent grouping, causing to react with the said liquid mass a cyanamide derivative selected from the class consisting of dicyandiamide, melamine and mixtures thereof, said cyanamide derivative being employed in an amount corresponding to from 2 to 20 per cent by weight of the said phenol, and completing the reaction between the said components at a pH below 7.0.

6. A method as in claim 5 wherein the ortho-substituted phenol is ortho-(1-phenethyl) phenol.

7. The method of preparing a light-colored, oil-soluble resinous composition which comprises forming a liquid mass having a pH above 7.0 and comprising mainly methylol derivatives of a para-substituted phenol having two reactive positions in the aromatic nucleus and containing at least four carbon atoms in the substituent grouping, causing to react with the said liquid mass a cyanamide derivative selected from the class consisting of dicyandiamide, melamine and mixtures thereof, said cyanamide derivative being employed in an amount corresponding to from 2 to 20 per cent by weight of the said phenol, and completing the reaction between the said components at a pH below 7.0.

8. A method as in claim 7 wherein the para-substituted phenol is a para-amyl phenol.

9. The method of preparing a resinous composition which comprises partially condensing phenol and an aqueous solution of formaldehyde under alkaline conditions to form a liquid reaction mass comprising a solution of methylol phenols in water, said solution having a pH above 7.0, adding melamine to the said solution in an amount corresponding to about 5 per cent by weight of the phenolic starting reactant, refluxing the resulting mixture to effect partial reaction between the components at a pH above 7.0, adding oxalic acid to the resulting syrup in an amount sufficient to bring its pH within the range of 2.0 to 4.0, and completing the reaction at a pH within the range of 2.0 to 4.0.

GAETANO F. D'ALELIO.

CERTIFICATE OF CORRECTION.

Patent No. 2,315,400.                                                           March 30, 1943.

GAETANO F. D'ALELIO

It is hereby certified that error appears in the printed specification of the above numbered patent requiring correction as follows: Page 1, first column, line 57, after the word "known" insert a comma; second column, line 39, in the formula, the word "dicyandiamide" should appear in the center of said line instead of in its present position; page 2, first column, line 3, for "Heat curable" read --Heat-curable--; line 8-9, for "dehyrating" read --dehydrating--; page 4, second column, line 17, for "acrylamides" read --acrylamide--; and that the said Letters Patent should be read with this correction therein that the same may conform to the record of the case in the Patent Office.

Signed and sealed this 8th day of June, A. D. 1943.

Henry Van Arsdale,
(Seal)                                                     Acting Commissioner of Patents.